Feb. 4, 1936.　　　　C. T. BARD　　　　2,030,019
AUTOMATIC BALL CLOSING FITTING
Filed May 27, 1935
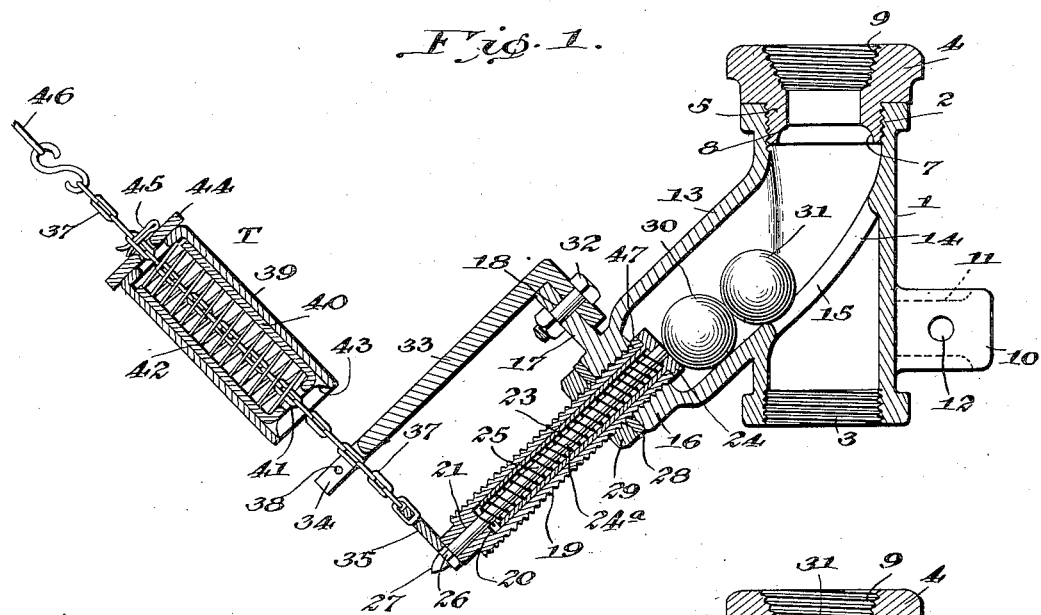
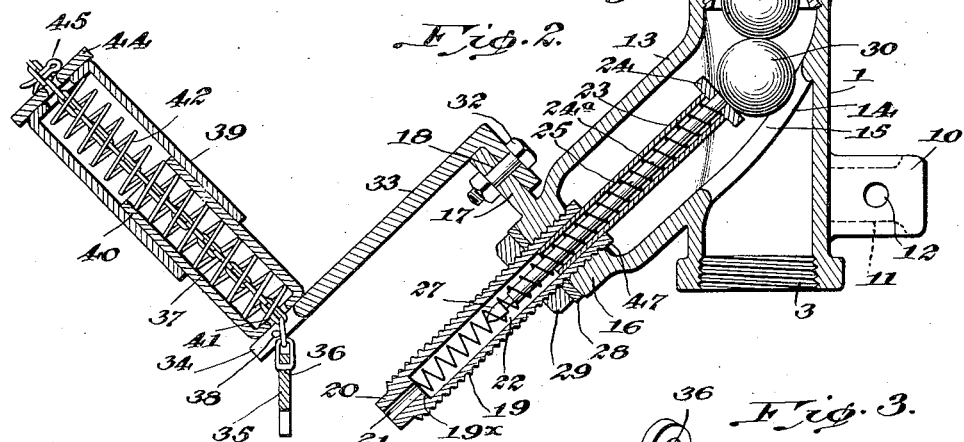
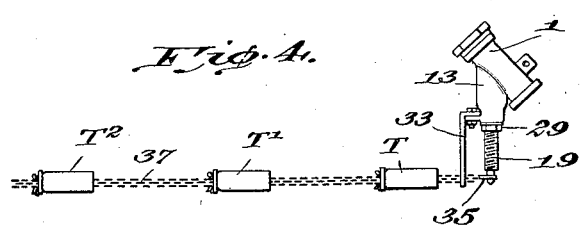
Inventor
Charles Tyler Bard
By Munn Anderson & Leddy
Attorney Patented Feb. 4, 1936

2,030,019

UNITED STATES PATENT OFFICE 2,030,019

AUTOMATIC BALL CLOSING FITTING

Charles Tyler Bard, Norwich, Conn.

Application May 27, 1935, Serial No. 23,766

5 Claims. (Cl. 137—162)

My invention relates to improvements in automatic ball closing fittings which may be used for closing pipe lines, such as gas lines or oil, water, steam or air lines to seal the flow, and it consists in the combinations, constructions and arrangements herein described and claimed.

The present invention is designed to be used in connection with the ball closing fitting disclosed in my prior application Serial No. 755,958, filed December 4, 1934.

An object of the present invention is to provide an automatic closing device which will operate on an abnormal rise of temperature, as for instance, during a fire, to effectively close the pipe and thus prevent additional danger, as for instance, where the fitting is used in connection with gas pipes for conveying inflammable gas.

A further object of the invention is to provide a simple device of the type described having a fusible element of a simple nature which will release a spring-actuated plunger to cause the closing of the pipe through which the fluid is normally flowing.

A further object is to provide an automatic device for operating a closure means which will not prevent the manual actuation of the closing mechanism.

A further object is to provide a simple mechanism for accomplishing the above named objects which requires very little change in the device as set forth in the prior application.

Other objects and advantages will appear in the following specification and the novel features of the invention will be particularly pointed out in the appended claims.

My invention is illustrated in the accompanying drawing forming a part of this application, and in which:

Figure 1 is a sectional view through the device showing it in a normally open position.

Figure 2 is a similar section showing the position of the parts when the closure is effected.

Figure 3 is a perspective view of a retaining fork, and

Figure 4 is a diagrammatic view showing the use of a plurality of fusible elements for actuating the closure means.

Referring now particularly to the drawing I have shown therein a fitting having a body portion 1 which is threaded internally at its ends, as shown at 2 and 3, respectively. A plug 4 has a reduced portion 5 which is threaded to engage the threads 2 of the body portion 1. These threads are of proper size to form a tight connection when screwed together. This plug has a cutaway portion 7 contiguous to a circular seat 8. The interior of the plug is hollow, as shown, and is threaded at 9 to engage the threads of a pipe connection, not shown.

The body portion 1 has a laterally extending integral lug 10 having flanges 11 and a bolt opening 12. This lug is for the purpose of connection to a meter bar when the fitting is used with a gas meter and of course, when the fitting is used in other connections, the lug may be omitted, since it has no particular bearing on the real invention of the case.

The body portion 1 has an integral angular cylindrical extension 13 which communicates with the interior of the body portion. A curved partition 14 extends across the interior of the body portion 1, as shown in the drawing, and this partition is provided with a slot 15, as plainly indicated in Fig. 3. The outer end of the cylindrical portion 13 terminates in a head 16 which has a threaded bore concentric with the axis of the cylindrical portion 13. The head 16 has a lug 17 which projects laterally on one side, as shown in the drawing, and this lug is provided with an opening 18 for a purpose hereinafter described.

A screw 19 is provided with threads to engage the threaded portion of the head 16. This screw is preferably made of steel. One end has a squared portion 20. The screw 19 as it will be observed has a central cylindrical bore 21 extending partly therethrough and communicating with a larger bore 22 extending to the opposite end. A plunger 23 is provided which fits the bore 22. This plunger is hollow and has a head 24 with a central bore to receive a pin 24a which is frictionally held in the bore and extends centrally of the plunger. A spring 25 is disposed within the plunger around the pin 24a, one end of this spring bearing on the head 24 and the other end on a shoulder 19x of the screw. The pin 24a, it will be observed, projects beyond the end of the hollow plunger and this portion is adapted to enter the bore 21, see Fig. 1. The plunger 23 is arranged to slide freely in the bore 22 of the screw. The spring 25 being concealed within the plunger, will not collect dirt and will operate efficiently at all times. The exterior surface of the plunger 23 may be lubricated and grease may be placed on the interior of the plunger so as to keep the spring in good working condition. The central pin 24a is provided with a reduced portion or groove 26 and with a tapered end portion 27. This groove 26 is so disposed that when the spring is compressed and the head 24 rests against the inner end of the screw 19, the groove is just beyond the end of the squared portion 20, see Fig. 1. A washer 28 and a nut 29 are provided for maintaining the screw 19 in adjusted positions.

Two accurately turned hardened steel balls 30 and 31 are dropped into the interior of the device upon the inclined partition 14 and roll down into the position shown in Fig. 1, the plug 4 having been removed for this purpose.

Secured to the lug 17 by means of a bolt 32 is an L-shaped bracket 33 having a slot 34 extending inwardly from one end thereof. A retaining fork 35 (see Fig. 3) is provided with an opening 36 to which a chain 37 or other flexible member may be attached. This chain passes normally through the slot 34 which serves as guide means and may be retained therein by a cotter pin 38. The forked end of the member 35 is arranged to straddle the reduced portion 26 of the plunger 19.

At T I have shown in general a fusible device for pulling the member 35 from the position shown in Fig. 1 when an abnormal temperature arises. This device consists of an outer cylindrical member 39 open at one end and having a central opening at the other. An inner cylinder 40 is slidably disposed with respect to the cylinder 39 and has an opening 41 at one end. A spring 42 is normally compressed and bears at one end against the end of the outer cylinder 39 and at the other end against the end of the inner cylinder 40. At 43 I have indicated a portion of solder which normally holds the two cylinders together against the tension of the spring 42. It will be observed that the flexible member or chain 37 passes through the interior of the fusible device. The latter bears against the washer 44 which is held by a cotter pin 45 secured to the chain 37.

From the foregoing description of the various parts of the device the operation thereof will be readily understood.

The plunger 23 is forced outwardly against the tension of the spring 25 until the fork 35 can engage the reduced portion 26 as stated. This holds the plunger in the position shown in Fig. 1. The balls 30 and 31 are now in a position to permit the flow of the gas or other fluid. If a fire should occur, the solder 43, or other fusible material, will melt and the spring 42 will drive the cylinders 39 and 40 apart. Eventually the cylinder 40 may engage the bracket 33 as shown in Fig. 2. The movement of the cylinder 39 will cause a jerk on the chain 37 thus withdrawing the retaining fork 35, and the plunger under the action of the spring 25 will force the balls from the position shown in Fig. 1 to that shown in Fig. 2, thus affording a firm closure as described in the prior application.

It will be observed that the chain 37 may be connected with a pull member 46. This pull member may be extended to any suitable distance so that by pulling on it the retaining fork 35 may be released manually.

The screw 19 is of the same diameter as the solid screw 19 in the prior application aforesaid, and one can be substituted for the other. While it is very unlikely that the spring 25 would fail to work since it is securely housed, as already described, yet if it should fail to work then the screw 19 could be turned at the squared end 20 so as to manually force the balls into closing position. In each instance the screws are put in from the inside. In the present instance the head 47 of the screw 19 will prevent the removal of the screw surreptitiously for the purpose of stealing gas. By replacing the screw 19 of the present case with a solid screw the device then works as disclosed in my prior application.

In the preferred form of the device the fork 35 is made of hardened steel, as is also the portion of the plunger bearing the groove, so that they will be held together firmly and indefinitely by the stiffness of the spring and the plunger, but will slide freely relatively to one another when force is used, as in the jerk from the fusible element or by a manual jerk on the chain. The invention contemplates, however, the use of a fork similar in shape to the fork 35 but made of solder so that the mere melting of the fork will cause the device to close by the action of the spring in the plunger.

The invention also contemplates the arrangement of a plurality of fusible devices similar to the one shown at T. Thus, in Fig. 4 I have shown additional devices $T_1$ and $T_2$ carried by the chain 37 and having similar fusible elements. Obviously a greater number could be used. The arrangement is such that these fusible devices may be located at some distance from the closure, and if a fire should occur the action of any one of these thermostatic devices would cause a jerk on the chain 37 and the release of the plunger and hence the closing of the valve in the manner described.

In Fig. 1 I have shown a device having the element as being in contact with the washer 44. This is true where the chain is substantially in a horizontal position but even if the chain should be in position where the device with the fusible element would move down toward the bracket 32, the action of the element when the solder is melted would be substantially the same, since in that event the end of the cylinder 39 would drive the washer against the cotter pin 45 and cause a jerk on the chain, as described.

I claim:—

1. An automatic ball closing fitting comprising a hollow body portion having an inlet opening and an outlet opening in axial alinement, a valve seat disposed at one of said openings, an integral angular extension carried on one side of said body portion, a freely rolling ball arranged to engage the seat, a spring actuated and a manually actuated means carried by the extension for forcing the ball against its seat, means for normally retaining the spring actuated ball forcing means in retracted position, and fusible means for releasing the spring actuated ball forcing means.

2. An automatic ball closing fitting comprising a hollow body portion having an inlet opening and an outlet opening in axial alinement and being provided with a seat, said seat being removable to permit the insertion of a ball, an integral angular extension carried on one side of said body portion, a freely rolling ball arranged to engage the seat, a spring-actuated plunger carried by the extension for forcing the ball against its seat, means for normally retaining the spring-actuated plunger in the retracted position, fusible means for releasing the spring-actuated plunger, and manual means for moving the plunger toward the ball, said manual means being operable from the exterior of the extension.

3. An automatic ball closing fitting comprising a hollow body portion having an inlet and an outlet in axial alinement and being provided with a seat, an integral angular extension carried on one side of said body portion, a ball arranged to engage the seat, a screw carried by said extension and being provided with a bore, a spring-pressed plunger carried in the bore of the screw for forcing the ball to its seat, means for normally retaining the spring-pressed plunger in the retracted position, and fusible means for releasing the spring-pressed plunger.

4. An automatic ball closing fitting comprising a hollow body portion having an inlet and an outlet in axial alinement and being provided with a seat, an integral angular extension carried on one side of said body portion, a ball arranged to engage the seat, a screw carried by said extension and being provided with a bore, a spring-pressed plunger carried in the bore of the screw for forcing the ball to its seat, a retaining fork for normally engaging the plunger to hold it in retracted position against the tension of the spring, and fusible means for pulling the retaining fork free from the plunger to permit the movement of the latter.

5. An automatic ball closing fitting comprising a hollow body portion having an inlet and an outlet in axial alinement and being provided with a seat, an integral angular extension carried on one side of said body portion, a ball arranged to engage the seat, a screw carried by said extension and being provided with a bore, a spring-pressed plunger carried in the bore of the screw for forcing the ball to its seat, a retaining fork for normally engaging the plunger to hold it in retracted position against the tension of the spring, means for pulling the retaining fork free from the plunger to permit the movement of the latter, said means comprising relatively movable members, a flexible member secured to the fork, a spring tending to move said members apart, means secured to one of said relatively movable members and connected to the flexible member, and a fusible means for normally holding the spring compressed and permitting when fused a relative movement of the spring compressing members whereby force is exerted on the chain to withdraw the retaining fork.

CHARLES TYLER BARD.